United States Patent [19]

Haines et al.

[11] 4,365,504

[45] Dec. 28, 1982

[54] METHOD AND APPARATUS FOR FIELD TESTING OF ANEMOMETERS

[75] Inventors: Donald A. Haines, East Lansing; John S. Frost, Mason, both of Mich.; Rosalie J. Klumpp, Idleyld Park, Oreg.

[73] Assignee: The United States of America as represented by the Secretary of Agriculture, Washington, D.C.

[21] Appl. No.: 270,676

[22] Filed: Jun. 4, 1981

[51] Int. Cl.³ .............................................. G01F 25/00
[52] U.S. Cl. ...................................................... 73/3
[58] Field of Search ................ 73/3, 168, 189, 861.85

[56] References Cited

U.S. PATENT DOCUMENTS 4,091,653  5/1978  Lee .......................................... 73/3

FOREIGN PATENT DOCUMENTS 1116948  2/1956  France ...................................... 73/3

*Primary Examiner*—S. Clement Swisher
*Attorney, Agent, or Firm*—M. Howard Silverstein; David G. McConnell

[57] ABSTRACT

An apparatus for field testing anemometers which utilizes an uncalibrated industrial hand blower powered by a constant pre-determined voltage is shown and described.

A method of calibration against a standard anemometer and a method of field testing anemometers by use of an apparatus using an industrial hand blower are described.

6 Claims, 1 Drawing Figure

METHOD AND APPARATUS FOR FIELD TESTING OF ANEMOMETERS

BACKGROUND OF THE INVENTION

1. Field of the Invention

This invention relates to accurate calibration and testing of anemometers which are located at remote places. These instruments over time may change in their readings because of deterioration and because of the lack of consistent periodic maintenance. It is necessary that a simple, reliable and portable apparatus be used for such field testing.

The accurate measurement of wind speeds, usually in remote places, is critical in predicting the behavior of forest and grass fires. Wind is the most significant variable among eleven that are used in fire rate-of-spread models. In an analysis and application of grass fuels data, it was found that a 17.5% wind speed error over the range of 13 to 30 miles per hour will result in a 40% error in predicted fire spread rates. Such high errors cannot be accepted when fires are being combatted. It is, therefore, vital to control of forest fires that a simple, reliable, portable and accurate means for periodically checking anemometers be used.

2. Description of the Prior Art

Because of the lack of a reliable calibration method, remote fire-weather stations have rarely checked their anemometers. In a few instances station observers have placed a new anemometer (usually not calibrated) next to the one in the field to check one against the others. This, however has proved inadequate because on a given day the range of natural wind speeds is limited, and tests over the range of 5 to 20 m.p.h. could not be made.

It has also been proposed to periodically test field units in wind tunnels. This is an expensive alternative and has been rejected.

Portable calibrators which rely upon centrifugal blowers have been used, but they are not compact.

Another method is the mounting of the anemometer to be tested upon the end of a long (6 feet) rotating boom. The wind speed measured is relative to the radial speed of the boom. This method is not portable and requires a large enclosed wind-free area for operation.

SUMMARY OF THE INVENTION

This invention utilizes a portable industrial blower having an adjustable manifold, a wooden base, a means for accurately measuring the voltage supplied to the blower, and a counter for measuring the test anemometer speed. It is essential to accurately regulate the voltage supplied to the blower motor so that the energy imparted to the air by the blower does not vary.

The apparatus is initially calibrated by testing an anemometer which has been previously calibrated in a wind tunnel. The blower motor voltage level is recorded, and the speed is measured at various blower manifold settings which produce different velocities to be measured.

DESCRIPTION OF THE PREFERRED EMBODIMENT

A. The Apparatus

Figure 1:
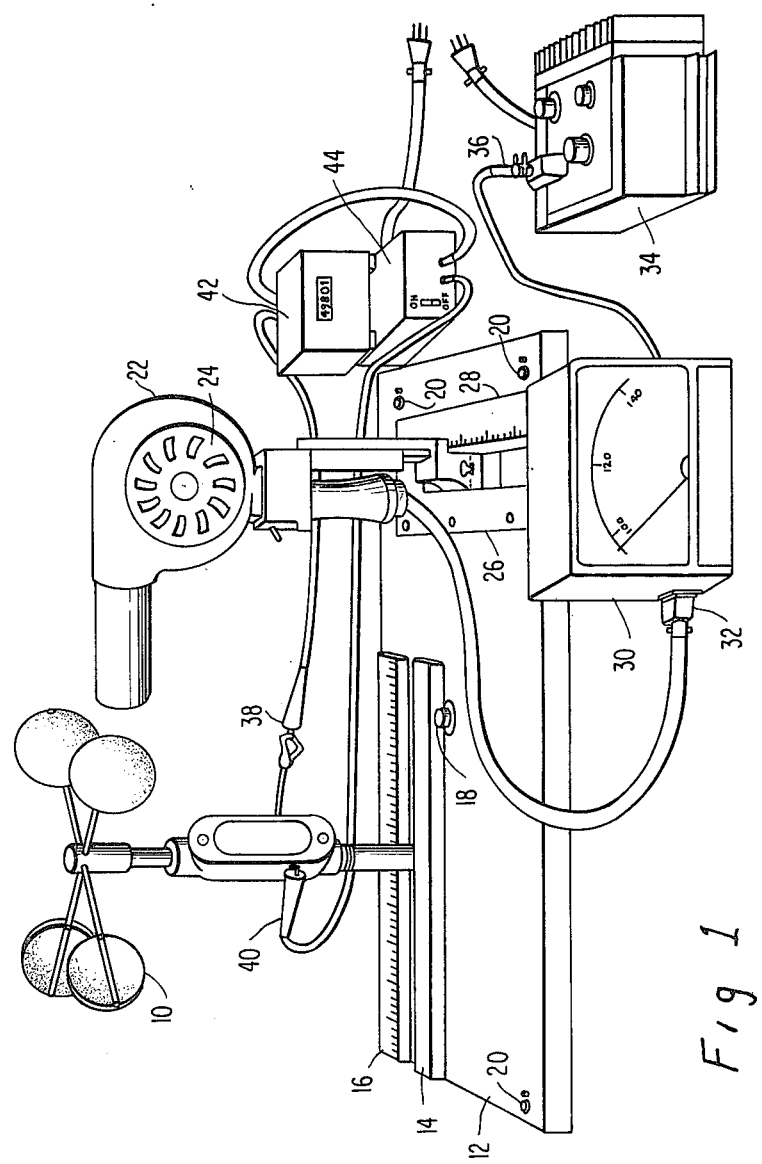
In FIG. 1, there is shown the measurement apparatus with its associated instrumentation.

The anemometer 10 is mounted on a testing board or base 12. Tracks 14 and 16 which include metal measuring rules hold the anemometer in the position required for the instrument under test. If different instruments are tested, it may also be necessary to provide for vertical adjustment of the anemometer position. A bubble level 18 is mounted on the board and is used with leveling screws 20 to level the assembly prior to calibration or testing.

The industrial blower 22 is a Master Industrial Heat Gun and Blower manufactured by Master Appliance Corporation, Racine, Wis. In the preferred embodiment Model #HG 201 was used. The heater element is removed because it is unnecessary for the generation of wind velocities for instrument testing. The blower 22 comes with an intake manifold 24 which, for purposes of this apparatus, is used to modify the velocity for different velocity test points. The blower 22 is mounted on tracks 26 and 28 which include a metal measure. These tracks permit the positioning of the blower with respect to the anemometer under test.

The blower 22 is electrically connected to a line voltage monitor 30 by means of the standard electrical plug 32 which is supplied with the blower. The line voltage monitor 30 is used to visually monitor the voltage during testing.

The line voltage monitor 30 is electrically connected to a manually operated variable voltage control 34 by means of the plug 36. The voltage control 34 is then connected to the available source of electrical power.

The anemometer output is connected by clips 38 and 40 to a twelve-volt D.C. counter 42 which produces an output indication of the measured wind speed. The D.C. counter 42 is powered by a 12-volt regulated power supply.

B. Operation and Method

Since this test apparatus is dependent upon the electrical and mechanical characteristics of the standard industrial blower 22, it is necessary to initially break in the blower by allowing it to run for a period of time prior to any calibration. Calibration is started after the running characteristics have stabilized.

Calibration is done with an anemometer which has been accurately tested and measured in a wind tunnel. This is necessary for each different type of anemometer to be field tested. The standard anemometer 10 is placed upon the test stand and aligned with the blower 22. The positions of both the blower 22 and the anemometer 10 are measured by the scales 16 and 28. It is by these steps that the predetermined position of the blower and the anemometer are ascertained. These must be recorded so that in the field testing the blower 22 and the anemometer 10 may be placed in the same relative position.

When the standard anemometer 10 is tested, the line voltage monitor reading should be recorded, and if there is a variation during testing, the voltage should be adjusted by the voltage control 34 to maintain a constant level. The maintenance of a known uniform predetermined voltage to the blower is essential to the accurate calibration as well as testing.

Calibration is done at a plurality of blower manifold 24 and track 14 and 16 settings in order to simulate different wind speeds. Variation of both blower manifold and track settings are used to simulate different wind speeds. Wind speeds of 5, 10, 15 and 20 miles per hour are significant in the measurements required to calculate fire spread rates. It has been found that 5 m.p.h. can be simulated with the manifold in its closed position and that 20 m.p.h. may be simulated with the manifold completely open. Intermediate settings of the manifold and tracks are used for the 10 and 15 m.p.h. speeds. These intermediate manifold settings are marked on the manifold 24 during calibration.

At each setting of the manifold 24 and tracks 14 and 16, the standard anemometer 10 output is observed and recorded. Once the anemometer position, blower position, blower pre-determined voltage level, and the standard anemometer output at each manifold setting are obtained, the calibration of the field test apparatus is complete.

The use of the apparatus for field testing requires essentially the same procedure that is used for calibration. The anemometer 10 is placed upon the apparatus in the same position as was the standard used in calibration. The blower 22 is next placed in the calibrated position.

At times in field testing, it is found that the line voltage will vary from that where the standard was tested. For this reason, the line voltage monitor 30 must be adjusted to the same value as was used during calibration. This is done by adjusting the variable voltage control 34.

Measurements are then taken at each manifold and track setting that were used in calibration. Finally the measurements observed at the D.C. voltage counter 42 are compared to those observed in the calibration run to determine the accuracy of the anemometer under test.

From the above description, it can be seen that this invention provides a compact and inexpensive apparatus for field testing anemometers.

What is claimed is:

1. An apparatus for field testing anemometers comprising in combination:
   a base;
   means for mounting an anemometer having an output to be tested on said base;
   an electrically driven blower having an adjustable manifold;
   means for mounting said electrically driven blower on said base; and
   an adjustable power supply means for supplying a constant pre-determined voltage to said electrically driven blower.

2. The apparatus of claim 1 wherein said blower is a hand held industrial blower unit.

3. The apparatus of claims 1 or 2 further comprising means to measure said anemometer output.

4. The apparatus of claims 1 or 2 wherein said means for mounting an anemometer and said means for mounting said blower include measuring rules.

5. The method of testing an anemometer comprising the steps of:
   calibrating the test apparatus against a standardized anemometer;
   placing the anemometer to be tested at pre-determined distances from an electrically driven blower;
   adjusting the manifold of said electrically driven blower to a plurality of pre-determined positions; and
   measuring the anemometer output at each of said manifold pre-determined positions and track distances.

6. The method of claim 5, further including the step of adjusting the voltage to said electrically driven blower to a pre-determined amount during each measurement.

* * * * *